ate of Patent: Jun. 23, 1987

United States Patent [19]
Rodriguez

[11] Patent Number: 4,674,710
[45] Date of Patent: Jun. 23, 1987

[54] AUTOMATIC FORMATION TURNS

[75] Inventor: Edward Rodriguez, Downey, Calif.

[73] Assignee: The United States of America as represented by the Secretary of the Air Force, Washington, D.C.

[21] Appl. No.: 788,268

[22] Filed: Oct. 17, 1985

[51] Int. Cl.$^4$ .............................................. B64C 13/20
[52] U.S. Cl. ...................................... 244/76 R; 244/3
[58] Field of Search ................... 244/75 R, 76 R, 2, 3, 244/17.13, 17 S

[56] References Cited

U.S. PATENT DOCUMENTS

| | | | |
|---|---|---|---|
| 2,400,400 | 5/1946 | Duer | 244/3 |
| 3,303,500 | 2/1967 | Prichodjko et al. | 343/103 |
| 3,863,256 | 1/1975 | Smith | 343/112 R |
| 4,192,002 | 3/1980 | Draper | 364/449 |

Primary Examiner—Joseph F. Peters, Jr.
Assistant Examiner—Rodney Corl
Attorney, Agent, or Firm—Bobby D. Scearce; Donald J. Singer

[57] ABSTRACT

A method for coordinated turning of a formation of aircraft flying at air speed V, the formation characterized by respective rearward displacement $D_S$ and lateral displacement $D_R$ of each follower aircraft in formtion from a leader aircraft relative to a formation line of flight, is described which comprises the steps of rolling the leader into the turn at predetermined roll rate for a first time interval $t_r$ to a leader bank angle $B_c$, maintaining the leader at that bank angle for a second time interval, and rolling the leader out of the turn at the same roll rate for a third time interval equal to the first interval, whereby the leader turns with determinable change in flight direction; and turning the follower in response to the rolling in of the leader by first gradually accelerating or decelerating the follower (depending upon whether on the outside or inside of the turn) to a second air speed from the start of leader roll-in until the earlier of leader roll-out inception and lapse of a time interval of $t_r + D_S/V$ from start of leader roll-in, maintaining the second air speed until start of leader roll-out, and gradually changing the air speed of the follower from the second air speed to that of the leader over a time interval of about $t_r + D_S/V$ from start of leader roll-out, while maintaining level flight from the start of leader roll-in until distance $D_S$ is traversed by the follower; and banking the follower into the turn to a first bank angle while adjacent that portion of the path the leader traversed during leader roll-in, banking the follower into the turn to a second bank angle while adjacent that portion of the path the leader traversed while maintaining bank angle $B_c$, banking the follower into the turn to a third bank angle while adjacent that portion of the path the leader traversed during leader roll-out, and returning the follower to level flight upon completion of the turn whereby the spacing between the leader and the follower is maintained substantially constant during the turn.

5 Claims, 6 Drawing Figures

AUTOMATIC FORMATION TURNS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for coordinated automatic formation turning for aircraft.

Some present Air Force aircraft (C-130 and C-141) incorporate AN/APN-169 Station Keeping Equipment (SKE) which is designed to enable pilots to maintain formation positions by providing them with raw position error data. Raw position error data are obtained by converting SKE radar range and bearing measurements into along heading and cross heading positions and comparing these to desired along heading and cross heading positions. SKE radar range and bearing measurements are obtained from a rotating antenna system approximately once each 1.5 seconds. The SKE equipment is designed primarily to accommodate relatively straight flights. During Air Force training flights in C-141 aircraft, it was noted that a problem exists with presently used manual systems for formation turns of more than about 6° change of heading wherein substantial pilot workload was required to rapidly move throttles to extreme settings in the coordination of speed, heading, bank and time interval calculations during the turn. No systems exist in the prior art by which automatic formation turns may be satisfactorily effected. Specifically, prior art systems have ignored finite time and roll rates of the leader and follower during the roll-in and roll-out portions of the turns.

The present invention comprises a method for coordinated formation turning usable with the autopilot/autothrottle systems of large aircraft such as the C-17. The system provides pitch, roll, and throttle flight director signals which are provided directly to the autopilot system thereby providing a capability for completely automatic formation flight and for controlling formation turns of any degree. Position sensing (SKE) equipment aboard each aircraft in the formation provides data to the aircraft's computer of air speed, heading, etc. The computer in the follower aircraft then calculates in accordance with the invention, the acceleration and bank angle of each aircraft in formation, and the nominal range and bearing to the leader aircraft. Similarly the computer in the leader aircraft generates the bank angle for that aircraft.

The method of the present invention utilizes mission computers of the aircraft to automatic formation turns and provides relatively simple acceleration patterns for followers, maintains safe follower positions during a turn, and provides correct end-of-turn position, air speed and heading for each follower. Both long and short turns may be accommodated, and unbriefed turns may be performed without pre-announced end-of-turn heading. The longitudinal accelerations and decelerations required of follower wingmen are minimized by initiating follower acceleration and deceleration immediately upon leader roll-in and roll-out for long turns. The resulting longitudinal acceleration requirements are small, and permit formation turns over substantially all of the aircraft's normal operating flight envelope. Lateral positioning may be properly maintained even if a follower does not accelerate exactly as required. The workload of each pilot in formation is therefore substantially relieved.

It is, therefore, a principal object of the present invention to provide a method for automatic formation turns for aircraft.

It is a further object of the invention to provide a method for formation turns for aircraft wherein aircraft speed and formation position before and after a turn is accurately maintained.

These and other objects of the present invention will become apparent as the detailed description of certain representative embodiments thereof proceeds.

SUMMARY OF THE INVENTION

In accordance with the foregoing principles and objects of the present invention, a method for coordinated turning of a plurality of aircraft, including a leader aircraft and at least one follower aircraft, flying in formation at a first air speed V, the formation characterized by respective rearward displacement $D_S$ and lateral displacement $D_R$ of each follower from the leader relative to a predetermined formation line of flight, is described which comprises the steps of rolling the leader into the turn at a predetermined roll rate for a first time interval $t_r$ to a leader bank angle $B_c$, maintaining the leader at that bank angle for a second time interval, and rolling the leader out of the turn at the same roll rate for a third time interval substantially equal to the first interval, whereby the leader turns with determinable change in flight direction; and turning the follower in response to roll-in of the leader by first gradually accelerating or decelerating the follower (depending upon whether on the outside or inside of the turn) to a second air speed from the start of leader roll-in until the earlier of leader roll-out inception and lapse of a time interval substantially equal to $t_r + D_S/V$ from start of leader roll-in, maintaining the second air speed until start of leader roll-out, and gradually changing the air speed of the follower from the second air speed to that of the leader over a time interval substantially equal to $t_r + D_S/V$ from start of leader roll-out, while maintaining level flight from the start of leader roll-in until distance $D_S$ is traversed by the follower; and banking the follower into the turn to a first bank angle while adjacent that portion of the path the leader traversed during leader roll-in, banking the follower into the turn to a second bank angle while adjacent that portion of the path the leader traversed while maintaining bank angle $B_c$, banking the follower into the turn to a third bank angle while adjacent that portion of the path the leader traversed during leader roll-out, and then returning the follower to level flight upon completion of the turn whereby the spacing between the leader and the follower is maintained substantially constant during the turn.

DESCRIPTION OF THE DRAWINGS

The present invention will be more clearly understood from the following detailed description of representative embodiments thereof read in conjunction with the accompanying drawings wherein:

FIG. 6 is a diagram of the paths of FIG. 5 to define range and bearing beyond roll-in.

DETAILED DESCRIPTION

Figure 1:
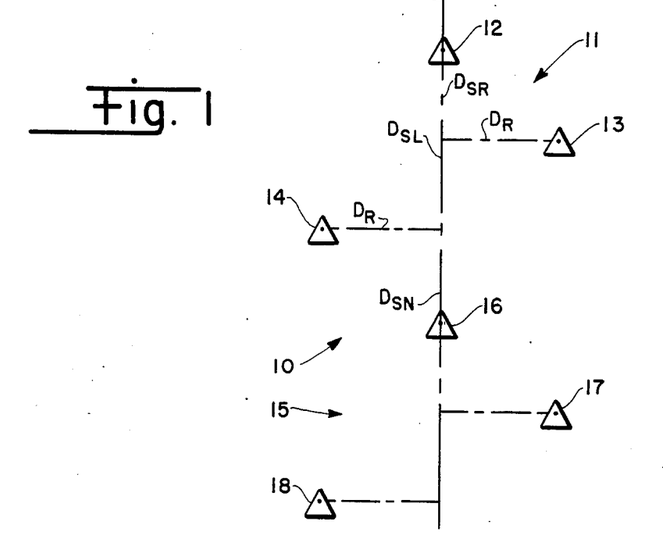
FIG. 1 is a schematic of a plurality of aircraft in a representative flight formation.

Referring now to FIG. 1, a diagram of a representative flight of aircraft is shown comprising two elements, each including three aircraft in formation. The type of formation depicted in FIG. 1 is characteristic of that which is often used for large transport aircraft such as the C-17, although the principles are applicable to other aircraft. Further, the teachings presented hereinafter may be applied to formations comprising a greater number of flight elements, and to a greater or lesser plurality aircraft in each element, the example presented in FIG. 1 being illustrative.

As shown in FIG. 1, a representative formation 10 may include a first element 11 comprising a leader aircraft 12, right wingman 13, and left wingman 14, as followers of leader 12, and a second element 15 comprising leader aircraft 16 and right wingman 17 and left wingman 18 as followers of leader 16. All aircraft in each element will ordinarily flow substantially at the same altitude. The leaders of each element normally fly as followers of the next preceding element leader. For example, leader 16 of element 15 may comprise a follower of leader 12 of element 11. The entire formation 10 is illustrated as flying along a flight direction 19 of determinable (pre-turn) heading. The leaders of each element may be required to fly over the airmass path 19 of the lead element leader, each stacked up a prescribed distance (e.g., 100 feet) in altitude from the next preceding leader.

In a formation of transport aircraft represented by formation 10 of FIG. 1, typical lateral displacements $D_R$ of each follower from the line of flight of the respective leader may be about 500 feet; typical longitudinal displacement $D_{SR}$ in formation between an element leader and a right wingman on a straight course may be about 4,000 feet (instrument conditions) or 2,000 feet (visual conditions); longitudinal displacement $D_{SL}$ between a leader and left wingman may typically be about 8,000 feet (instruments) or 4,000 feet (visual); between successive element leaders a longitudinal displacement $D_{SN}$ of about 12,000 feet (instruments or visual) may typically be maintained. In formation turns according to the present invention, each laterally displaced follower aircraft (e.g., 13,14 in element 11) is required to accelerate (or decelerate) longitudinally while maintaining altitude on entering and exiting turns in order to maintain formation. The capability of an aircraft to accelerate longitudinally while maintaining altitude diminishes near the extremes of the flight envelope of that aircraft (e.g., high altitude, high speed and heavy load). Thus a portion of the flight envelope of the aircraft exists in which formation turns are not feasible. In a method for making formation turns, minimizing the maximum longitudinal acceleration required of the follower aircraft is therefore desirable to permit automatic formation flight over as much of the flight envelope of the aircraft as practical.

In the execution of formation turns according to the invention, follower accelerations are strongly dependent on the desired positions of the followers relative to the leader during the turn, some positions requiring excessive follower acceleration to maintain. For example, if a follower position is defined as a constant lateral distance abreast a past leader position, the acceleration required of the follower on entering and exiting turns may be excessively large. If the follower position is defined along a path parallel to the leader path and maintained at a constant slant range distance to the leader, smaller but more complicated follower accelerations may be required.

Figure 2:
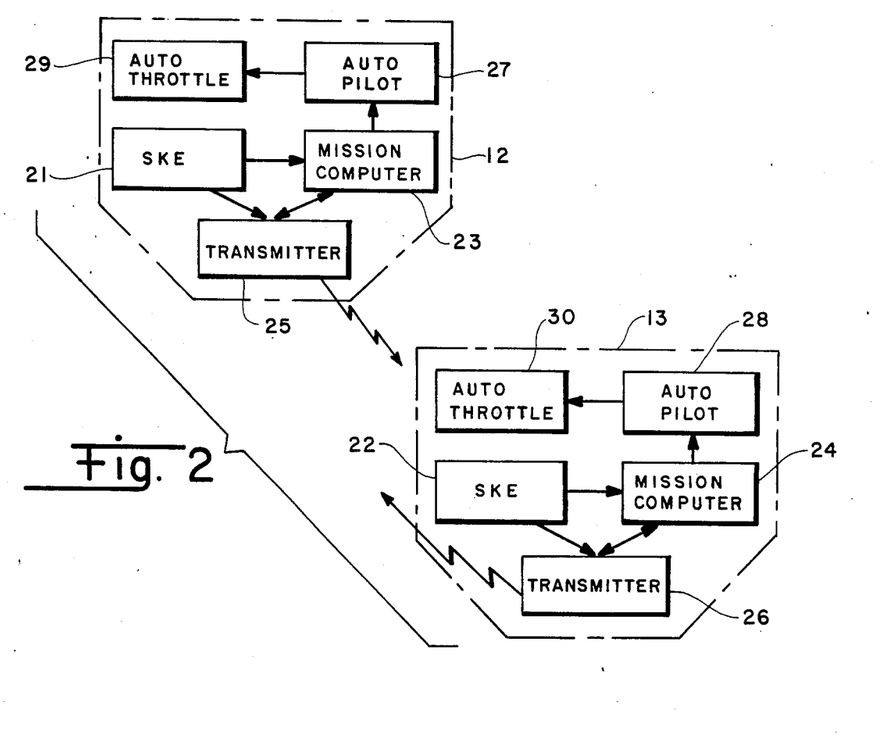
FIG. 2 is a schematic of a leader and follower aircraft in formation showing utilization of on-board systems for the execution of turns according to the present invention.

Referring now to FIG. 2, shown therein is a schematic of leader aircraft 12 and follower aircraft 13 in formation illustrating the equipment aboard each aircraft usable in the execution of turns according to the present invention. Station keeping equipment (SKE) 21,22 provide raw position, heading and air speed data for each respective aircraft. The mission computers 23,24 then calculate velocity, acceleration and bank angle parameters for each aircraft according to the method herein described in accordance with transmitter 25,26 communications between leader aircraft 12 and follower aircraft 13 of end-of-turn heading, time interval for bank, maximum bank angle or banking rate, or velocity or combination of parameters required to effectively coordinate a turn. Each mission computer 23,24 may be programmed to control the autopilot 27,28 and autothrottle 29,30 of each aircraft. Therefore, according to the procedures developed herein, each follower aircraft, in response to appropriate commands and certain predetermined turn parameters, may accelerate, decelerate or bank according to the respective formation position to accomplish the turn with proper speed, position and heading.

The respective on-board mission computers for each leader and follower in formation may be programmed to calculate bank angle and acceleration requirements for feeding the autopilot/autothrottle systems of each aircraft, which programs may be generated by one with skill in the applicable art.

The principles embodied in the present invention may be applied to leader-follower speeds and displacements of substantially any dimensions, and of predetermined bank angles and roll-in/roll-out times, of varying magnitudes during a given formation turn. However, for the purpose of describing the invention herein, it is assumed that the leader flies a formation turn at a substantially constant air speed V. Upon commencing a turn, the leader informs the followers of the direction (right or left) of the turn, and signals the moment banking by the leader begins. At that moment the followers (including any following element leaders) begin integrating air speed in accordance with the nominal acceleration requirements defined below. The leader rolls to a predetermined bank angle $B_c$ (usually about 20°) at a predetermined and essentially constant roll rate k, holds $B_c$ constant for a definite time $t_c$ (depending on the intended degree of turn) and, upon signal to the followers, rolls out at the same essentially constant roll rate used for roll-in. Each follower varies air speed and bank angle in accordance with the nominal requirements as defined below. The path of each aircraft is considered to be that generated in the airmass and is therefore independent of the wind and is a continuous smoothly curved path; discontinuities or abrupt changes in path direction are not considered.

Figures 3, 4:
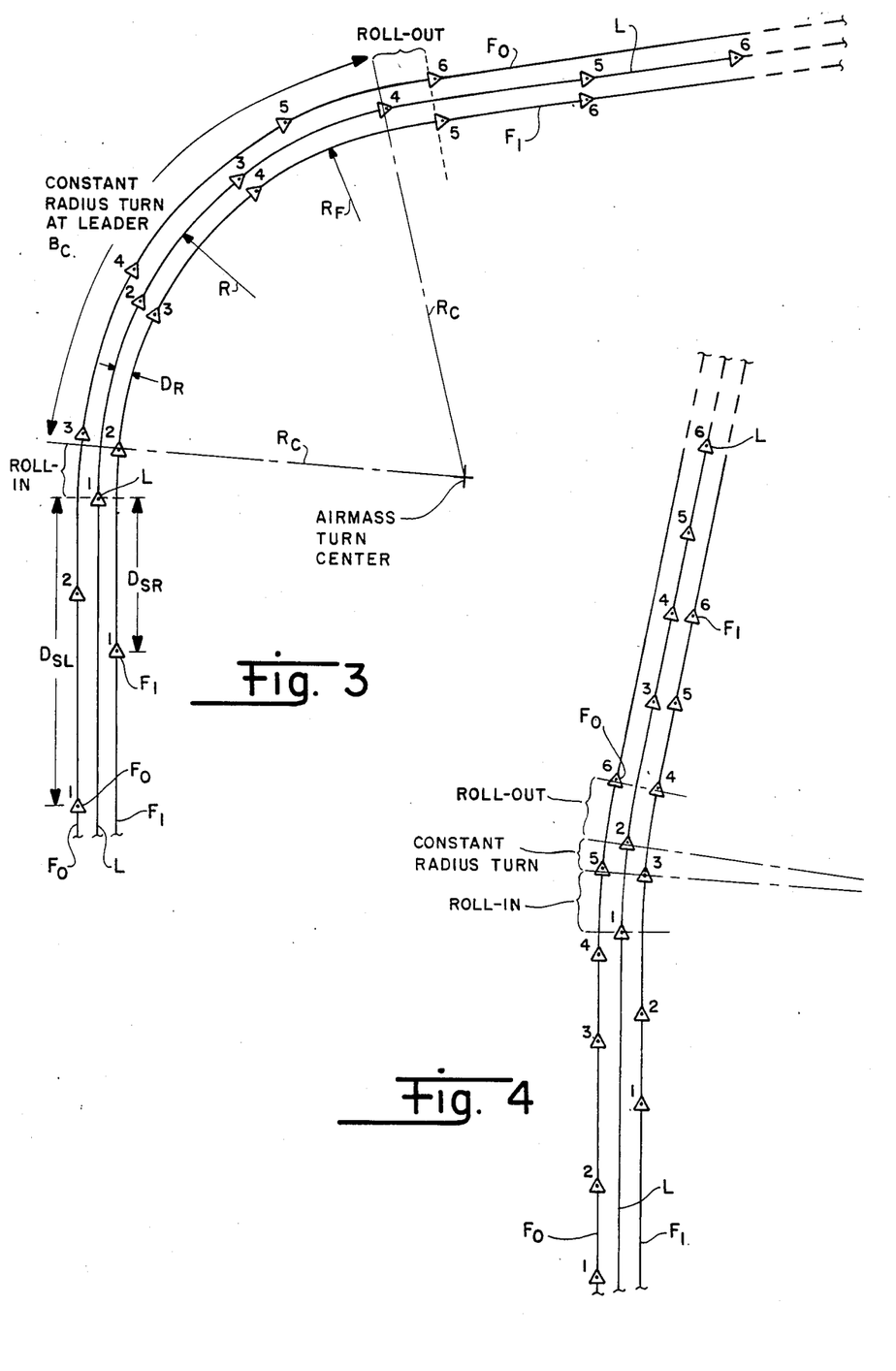
FIG. 3 is a diagram substantially to scale of a long turn for a representative formation according to the present invention.
FIG. 4 is a diagram substantially to scale of a short turn for a representative formation according to the present invention.

To illustrate the formation positions the followers maintain relative to the leader, and the nominal accelerations, air speeds and bank angles for the method of the invention, FIGS. 3 and 4 respectively present schematics of a long right turn and a short right turn, drawn substantially to scale, and including formation positions at six successive times for each turn for leader L, a right wingman illustrated on the inside of the turn as follower $F_I$, and a left wingman illustrated on the outside of the turn as follower $F_O$ in formation similar to that described in relation to FIG. 1.

Consider now an aircraft moving along a curved path at speed V and undergoing an angular rate of change of path direction $d\psi/dt$. The aircraft generates centripetal acceleration by banking, thereby directing a portion of its lift in the horizontal direction. If the aircraft is maintaining altitude at a normal speed (so the pitch angle is reasonably small) and is not slipping or skidding excessively, the centripetal acceleration $A_c$ of the aircraft at bank angle B may be approximated by:

$$A_c = V d\psi/dt = g \tan B \qquad (1)$$

Since $d\psi/dt = V/R = V d\psi/ds$, path curvature R on the path $d\psi/ds$ is given by:

$$d\psi/ds = 1/R = g(\tan B)/V^2 \qquad (2)$$

The initial segment of acceleration for a follower begins when the leader begins roll-in. The follower acceleration, magnitude and sign during initial $A_1$ and final $A_3$ segments is given by:

$$A_1 = V D_R / R_c (t_r + D_S/V) = -A_3 \qquad (3)$$

where $D_R$ is defined as positive if the follower is on the outside of the turn and negative on the inside, V is the leader true air speed (assumed constant), and $t_r$ is a prearranged time the leader takes to roll-in or roll-out (typically about 4 seconds).

The radius of turn $R_c$ of the leader airmass path while the leader maintains a predetermined bank angle is given by:

$$R_c = V^2/g \tan B_c \qquad (4)$$

where g is acceleration of gravity. The initial segment of follower acceleration is constant and ends at time $(t_r + D_S/V)$ from start of leader roll-in, or at start of leader roll-out, whichever occurs first. During a middle segment of the turn from time $(t_r + D_S/V)$ until the leader begins roll-out, the follower has substantially zero acceleration. The final segment of constant acceleration begins when the leader begins to roll-out of the turn or, of the leader has begun roll-out, at time $(t_r + D_S/V)$ after inception of roll-in. The initial and final segments of constant acceleration are maintained for substantially equal time intervals.

By combining Eqs (3) and (4), the constant acceleration (deceleration) requirement can be alternatively expressed as, $$A_1/g = D_R(\tan B_c)/(V t_r + D_S) \qquad (4a)$$

which shows that the required acceleration is largest for the right wingman (i.e., on the inside of the turn) and, for given speed, can be made smaller by selecting a smaller bank angle $B_c$ and/or a larger roll-in/roll-out time $t_r$.

The follower acceleration requirements are of two types depending on the length of time $t_c$. If $t_c$ is greater than $D_S/V$, (viz., a long turn, FIG. 3), the follower ceases the initial acceleration at $(t_r + D_S/V)$ after inception of leader roll-in, and begins the final acceleration when the leader begins to unbank. If $t_c$ is less than $D_S/V$, (viz., a short turn), the follower ceases initial acceleration when the leader begins to unbank, and begins the final acceleration $(t_r + D_S/V)$ after inception of leader roll-in.

Consider now the relationships between the parallel paths of a leader L and follower F. For illustration purposes, reference may be made to FIG. 3 showing a leader L, follower $F_I$, and follower $F_O$. Any point on a path F is abreast of a corresponding point on path L if the point on path F lies on a line drawn normal to path L and through the corresponding point on path L. If the path directions at abreast points are equal to each other at all pairs of abreast points, the paths are parallel and the distance between the abreast points is constant (herein designated $D_R$). The radius of curvature of path L is the same direction as that of path F at a corresponding abreast point, and, since the change in path direction on path F is the same as path L at corresponding abreast points, both paths have the same center of curvature at each pair of abreast points, and differ only by the distance $D_R$ between the paths. The radius of curvature $R_F$ of path F is related to the radius R of path L at corresponding abreast points by, $$R_F = R + D_R = dS_F/d\psi = dS/d\psi + D_R \qquad (5)$$

where $D_R$ is positive if path F is outside path L and negative if inside path L. Thus the follower bank angle $B_F$ required at an abreast point on path F and speed $V_F$ may be determined from Eqs (1) and (2) as, $$g \tan B_F = V_F^2/(R + D_R) \qquad (6)$$

and the leader bank angle B in path L is given by $$g \tan B = V^2/R \qquad (7)$$

Multiplying Eq (5) by $d\psi$ and integrating over pairs of abreast points gives the distance $S_F$ a follower travels along path F as a function of the distance S a leader travels along path L between pairs of corresponding abreast points, $$S_F = S + D_R(\psi - \psi_o) \qquad (8)$$

where $\psi_o$ is the path direction at the beginning of path distance $S_F$ or S and $\psi$ is the path direction at end of path distance $S_F$ or S, provided the integration is not through points of inflection in the paths.

The follower path distance $S_{FR}$ traveled while abreast of the leader roll-in segment of the turn $S_R$ is therefore given by:

$$S_{FR} = S_R + D_R(\psi_R - \psi_o) \qquad (9)$$

where $(\psi_R - \psi_o)$ is the change in path directiion during roll-in. Since the leader in this analysis is assumed to fly at constant speed V, the leader path distance $S_R$ during roll-in time $t_r$ is $V t_r$. During $t_r$ the leader bank angle B changes at a constant rate k, such that tan B=kt. Therefore, at time $t_r$, B equals $B_c$, and during leader roll-in.

$$\tan B = (\tan B_c)t/t_r \quad (10)$$

The centripetal acceleration generated by the leader during roll-in is, from considerations of Eqs (1) and (10)

$$V d\psi/dt = g(\tan B_c)t/t_r \quad (11)$$

Integrating $d\psi/dt$ over $t_r$ gives the change in $\psi$ during roll-in, $$(\psi_R - \psi_o) = g(\tan B_c)t_r/2V \quad (12)$$

and substituting $R_c$ derivable from Eq (2), gives:

$$\psi_R - \psi_o = Vt_r/2R_c \quad (13)$$

Using this result in Eq (9) gives the path distance a follower travels during the time the follower is abreast of the leader roll-in path, vis., $$S_{FR} = Vt_r(1 + D_R/2R_c) \quad (14)$$

where $D_R$ is positive or negative as defined above.

During the leader constant bank segment of the turn lasting time $t_c$, the leader travels a distance $Vt_c$. The angular change in path direction during time $t_c$ is from Eq (13) equal to $Vt_c/2R_c$, and the follower path distance $S_{Fc}$ while abreast of the constant bank angle portion of the leader turn is, in analogy to Eq (14), $$S_{Fc} = Vt_c(1 + D_R/R_c) \quad (15)$$

During roll-out, the leader generated centripetal acceleration is, from Eq (1):

$$g(\tan B_c - kt) = g \tan B_c(1 - t/t_r) \quad (16)$$

where $t_r$ is also the time for roll-out, and $d\psi/dt$ is:

$$d\psi/dt = g(\tan B_c)(1 - t/t_r)/V \quad (17)$$

Integrating $d\psi/dt$ over $t_r$ gives change in $\psi$ during roll-out:

$$\psi_{RO} - \psi_o = Vt_r/2R_c \quad (18)$$

It may be noted at this point that the equations used by a leader in an element of the formation following a preceding element, such as element leader 16 of FIG. 1, are the same as that used for the next preceding leader delayed by a time $D_{SN}/V$.

Since the leader rolls out at the same rate k as for roll-in, the bank angle during roll-out may be given by:

$$\tan B = (\tan B_c)[1 - (t - t_{RO})/t_r] \quad (19)$$

where $t_{RO}$ is the time of inception of roll-out.

The path distance a follower traverses $S_{FR}$ while abreast of the leader roll-out path is identical to that for roll-in given by Eq (19), viz., $$S_{FR} = Vt_r(1 + D_R/2R_c) \quad (20)$$

The bank angle requirements for a follower at known air speed and determinable airmass distance traversed on the follower path may be specified first by determining the follower bank angle required while adjacent the leader roll-in path. From Eqs (2), (6), (7) and (10), it is readily seen that, $$R = V^2/g \tan B = V^2 t_r/g(\tan B_c)t = R_c Vt_r/S \quad (21)$$

where S is the distance along the leader path from inception of roll-in, and the follower bank angle is:

$$B_F = \tan^{-1}[V_F^2/g(R_c Vt_r/S + D_R)] \quad (22)$$

The distance $S_F$ along the follower roll-in path may be related to the abreast distance S along the leader roll-in path by using the relationship $d\psi = dS/R$, and substituting R from Eq (21):

$$dS_F = dS + (D_R/R_c Vt_r)S dS \quad (23)$$

which when integrated gives the relationship between $S_F$ and S during roll-in:

$$S_F = S + (D_R/R_c Vt_r)S^2/2 \quad (24)$$

Eq (24) is a quadratic equation having a solution:

$$S = [(1 + 2D_R S_F/R_c Vt_r)^{\frac{1}{2}} - 1]R_c Vt_r/D_R \quad (25)$$

Combining Eqs (22) and (25) yields the expression for follower bank angle during roll-in.

$$B_F = \tan^{-1}\{[1 - (1 + 2D_R S_F/R_c Vt_r)^{-\frac{1}{2}}]V_F^2/gD_R\} \quad (26)$$

In executing the turn, and beginning at the moment the leader initiates bank, the follower maintains zero bank angle over an airmass distance equal to the follower longitudinal displacement $D_S$ behind the leader (i.e., a distance equal to $D_{SR}$ or $D_{SL}$ of FIG. 1). The onboard computer of each follower determines when the respective distance $D_S$ is traversed by integrating air speed. Starting at the moment each follower has traversed the respective airmass distance $D_S$ and an additional airmass distance $S_{FR}$, the follower nominal bank angle $B_F$ is determined according to Eq (26). The onboard computer of each follower determines $S_F$ at each instant of time by integrating air speed.

The follower bank angle required while adjacent the leader constant bank angle path is, from Eq (6), $$B_F = \tan^{-1}[V_F^2/g(R_c + D_R)] \quad (27)$$

where the radius of curvature R of the leader path at a point abreast of the follower position is a constant $R_c$.

The follower bank angle required while adjacent the leader during roll-out may also be determined from Eq (6). As in roll-in, R is a function of the distance S from start of roll-out along the leader path, R having been determined by the leader rolling-out at a constant rate of change of bank angle tangent. The leader starts roll-out from bank angle $B_c$, thus, from Eq (25), $$R = V^2/g \tan B = V^2/g [\tan B_c - (\tan B_c)t/t_r] \quad (28)$$
$$= V^2/g (\tan B_c)(1 - S/Vt_r)$$
$$= R_c/(1 - S/Vt_r)$$

Thus, $$B_F = \tan^{-1}\{V_F^2/g[R_c/(1 - S/Vt_r) + D_R]\} \quad (29)$$

The distance $S_F$ along the follower roll-out path may be related to the abreast distance S along the leader roll-out path by substituting $R_c/(1-S/Vt_r)$ for R in Eq (5), which is still valid in this case, and integrating:

$$S_F = (1 + D_R/R_c)S - D_R S^2/2R_c V t_R \quad (30)$$

Eq (30) is a quadratic equation in S, a solution being:

$$S = \frac{(1 + D_R/R_c)Vt_r}{D_R/R_c}\left\{1 - \left[1 - \frac{2D_R S_F/R_c}{(1 + D_R/R_c)^2}\right]^{\frac{1}{2}}\right\} \quad (31)$$

Substituting Eq (31) into (29) yields follower bank angle during roll-out:

$$B_F = \tan^{-1}\{[1-((1+D_R/R_c)^2 - 2D_R S_F/R_c V t_r)^{-\frac{1}{2}}]V_F^2/gD_R\} \quad (32)$$

The only variables in the expressions for bank angle in each turn segment are $V_F$ and $S_F$. All other parameters are constants known prior to beginning the turn.

Zero bank angle for the follower is reached when $S_F$ equals $S_{FR}$ along the roll-out path equivalent in length to that given in the roll-in segment in Eq (20).

The nominal acceleration and bank angle requirements for the follower as just described, if followed exactly, result in completion of the turn at correct position, heading and air speed. The follower's computer can determine when the follower is adjacent the leader's path segments (therefore when to switch equations) and can determine the parameter $S_F$ for substitution into Eqs (26) and (32) at each instant of time during the turn as follows:

1. When the leader signals inception of roll-in, the follower starts integrating air speed to determine the airmass distance $S_F$ being traversed;
2. When $S_F$ equals $D_S$, the follower is adjacent the beginning of the leader roll-in path segment, begins using Eq (26) and restarts integrating air speed;
3. When $S_F$ equals $Vt_r(1+D_R/2R_c)$ (leader roll-in segment of FIGS. 3 and 4), the follower is adjacent the beginning of the leader constant bank path segment, begins using Eq (27) and restarts integrating air speed;
4. When $S_F$ equals $Vt_r(1+D_R/R_c)$ (constant radius turn segment of FIGS. 3 and 4), the follower is adjacent the beginning of the leader roll-out path segment, begins using Eq (32a) and restarts integrating air speed;
5. When $S_F$ equals $Vt_r(1+D_R/2R_c)$, when the leader is a distance $D_S$ beyond roll-out, the follower is adjacent the end of the leader roll-out path segment (see FIGS. 3 and 4) and ceases using Eq (32).

Referring again specifically to FIG. 3 which illustrates a long right turn, for a leader constant air speed (pre-turn formation air speed) V = 200 knots, constant bank angle $B_c = 20°$, radius of turn at constant bank $R_c = 9747.91$ feet, roll-in and roll-out time $t_r =$ four seconds, turn time at constant bank $t_c = 36.6$ seconds, heading change of 80.66°, and follower displacements $D_R = 500$ feet, $D_{SR} = 4000$ feet, and $D_{SL} = 8000$ feet. At the respective positions labeled 1, the leader begins roll-in, follower $F_I$ (or in general the wingman on the inside of the turn) begins deceleration, and follower $F_O$ (or in general the wingman on the outside) begins acceleration. After respective times $(t_r + D_S/V)$ (15.834 sec for $F_I$ and 27.57 sec for $F_O$) the followers cease deceleration ($F_I$ position 2) and acceleration ($F_O$ position 3) at respective air speeds of 189.74 and 210.25 knots. After an additional time $t_c$ (total time 40.60 sec from start of roll-in), at position 4 for L, $F_I$ and $F_O$, the leader begins roll-out and $F_I$ begins acceleration and $F_O$ begins deceleration toward pre-turn air speed (200 knots). After respective times $(2t_r + t_c + D_S/V)$ from start of roll-in (56.43 sec for $F_I$, 68.27 sec for $F_O$), $F_I$ ceases acceleration (position 5) and $F_O$ ceases deceleration (position 6) at 200 knots.

Referring now to FIG. 4, illustrated therein is an example of a short right turn having corresponding turn parameters, V = 200 knots, $B_c = 20°$, $R_c = 9747.91$ feet, $t_r =$ four seconds, $t_c =$ two seconds, heading change = 11.92°, $D_R = 500$ feet, $D_{SR} = 4000$ feet, and $D_{SL} = 8000$ feet. At the respective positions labeled 1, the leader begins roll-in, follower $F_I$ begins deceleration, and follower $F_O$ begins acceleration. After time $(t_r + t_c)$ (6 sec for $F_I$ and $F_O$) the followers cease deceleration ($F_I$) and acceleration ($F_O$) at respective air speeds of 196.1 and 202.2 knots (positions 2). At time $(t_r + D_{SR}/V)$ (total time 15.834 sec from start of roll-in) $F_I$ begins acceleration (position 3). At time $(2t_r + t_c + D_{SR}/V)$ (total time 21.834 sec) $F_I$ ceases acceleration (position 4) at 200 knots. At time $(t_r + D_{SL}/V)$ (total time 27.669 sec) $F_O$ begins deceleration (position 5). At time $(2t_r + t_c + D_{SL}/V)$ (total time 33.669 sec) $F_O$ ceases deceleration at 200 knots (position 6). The maximum required acceleration is that of the right wingman which for $F_I$ is $\pm 1.0954$ ft/sec$^2$ or about $\pm 0.034$ g. This level of required acceleration will allow formation flight turns to be performed over most of the C-17 flight envelope.

During automatic formation flight, SKE measurements of range and bearing to the leader are used to generate along-heading and cross-heading displacements between the leader and follower, which are compared to the desired displacements $(D_R, D_S)$ to determine along-heading and cross-heading displacement errors. The follower air speed $V_F$ may be considered to be of the sum of the leader air speed V and the rate of change of the along heading displacement error, $\Delta V$. The SKE measurements are discrete measurements normally made at about 1.5 second intervals and are a measure of the value of the $\Delta V$ approximately 0.75 second earlier. The follower's computer can combine each discrete measure $\Delta V_i$ with the corresponding value $V_{Fi}$ of the follower air speed at that same earlier time to form discrete measures of $V_i$, viz., $$V_i = V_{Fi} - \Delta V_i \quad (33)$$

Starting at the time the leader signals that a turn is to commence (approx 30 seconds prior to inception of turn), the discrete measures $V_i$ are averaged to determine the pre-turn air speed V:

$$V = \frac{1}{N} \sum_{i=1}^{N} (V_{Fi} - \Delta V_i) \quad (34)$$

where N is a plurality of discrete measurements (usually about 20).

During formation total turn time T equal to $(2t_r + t_c + D_S/V)$, the leader travels a distance $D_T$ equal to VT, and the follower travels distance $D_{FT}$, given by:

$$D_{FT} = D_S + 2Vt_r(1 + D_R/2R_c) + Vt_c(1 + D_R/R_c) \quad (35)$$

$$= D_T + VD_R/R_c(T_r + T_c)$$

If the follower completes the turn at the right time, the follower air speed integrated over the entire turn time T must be equal to $D_{FT}$, which is equivalent to requiring the follower air speed to be equal to that of the leader at the start and end of the turn.

For a long turn ($t_c > D_S/V$), and after the end of the roll-in, the follower should maintain a position which keeps a constant turn angular separation from the leader. The follower angular turn rate $d\psi_F/dt$ must therefore be equal to that of the leader $d\psi/dt$, during the the constant bank portion of the turn:

$$V_F/(R_c+D_R) = V/R_c$$

Thus, at the end of follower roll-in and during the time the leader is at a constant bank, follower air speed $V_{Fc}$ is constant:

$$V_{Fc} = V(1 + D_R/R_c) \quad (36)$$

which is maintained until the leader begins roll-out.

The maximum acceleration required of a follower may be minimized by constraining the follower to a constant acceleration for a short time $t_x$ at the beginning and at the end of the formation turn. From Eq (36), it follows that, $$(t_r+t_c)VD_R/R_c = (T-t_x)/VD_R/R_c \quad (37)$$

or, $$(T-t_x) = (t_r+t_c) \quad (38)$$

and, since $T = 2t_r + t_c + D_s/V$, it follows that:

$$t_x = t_r + D_S/V \quad (39)$$

Therefore, the initial constant acceleration $A_1$, must cease at $t_r + D_S/V$, the time the leader is a distance $D_S$ beyond the end of roll-in, which is not necessarily the time the follower is at the end of roll-in, and the final constant acceleration $A_3$ must begin at the moment the leader begins roll-out, the values of each being given by Eq (3).

Accordingly, for long formation turns made with impromptu turn commands, the leader need only signal turn direction and inception of roll-in. The degree of the turn need not be signalled prior to the inception of the turn as with current practice; however, turns may be accomplished by predetermination of degree of turn, in which case the onboard computer will determine the time the leader begins roll-out, that is, $t = (t_r + t_c)$ using the corresponding Eqs (10) to (13).

For a short turn ($t_c < D_S/V$) the leader begins roll-out before traveling a distance $D_S$ beyond roll-in (i.e., before $t = t_r + D_S/V$). To keep the requirements for both long and short turns simple and to retain the capability of performing impromptu turns, the same initial and final acceleration may be used as for the long turns. With these constraints the follower stops the initial acceleration at the moment the leader begins roll-out (i.e., at $t = t_r + t_c$) and begins final acceleration phase at:

$$T - (t_r + t_c) = t_r + D_S/V \quad (39)$$

The constant air speed $V_{FM}$, the follower should maintain between times $(t_r + t_c)$ and $(t_r + D_S/V)$ is, $$V_{FM} = VD_R(t_r+t_c)/R_c(t_r+D_S/V) \quad (40)$$

which satisfies Eq (37) that the follower arrive at the end of the turn at the correct time.

A comparison was made of the acceleration requirements of a follower $F_I$ (inside the turn) according to the method of the invention with capability estimates for a typical (350,000 pounds) and a heavily loaded (450,000 pounds) C-17A aircraft to increase air speed (accelerate longitudinally at cruise) while maintaining altitude with wings level. The acceleration capability at long range cruise speed and altitude and at zero bank angle is reduced approximately 0.0008 g for the typical aircraft and 0.001 g for the loaded aircraft when the aircraft is put into a 10° bank. Over most of the C-17A flight envelope ample acceleration capability margin over requirement exists for typical formation turns up to 20° constant bank angle for a relatively fast roll-in/roll-out time of 4 seconds. However, when flying at high altitudes and speeds, such as at long range cruise, the acceleration capability may not be adequate for formation turns up to 20° bank; short roll-in/roll-out times, but smaller bank angles, such as 10°, and longer roll-in/roll-out times, such as 10 seconds, result in acceleration capability margin over requirement. Therefore formation turns can be performed using the method presented herein without losing nominal formation position over the normal operating flight envelope of the C-17A aircraft.

In executing a turn in which acceleration needed to maintain formation position exceeds aircraft capability, the bank angle equations developed above substantially maintain follower lateral positioning regardless of follower air speed or acceleration. Thus an inability to achieve the required rate of increase of air speed would result only in a lag in follower position behind the correct nominal in-path position. The position error will cause the on-board computer to continue to demand acceleration until the in-path position error is reduced to zero, which may occur some time after the completion of the turn. In an extreme example, Eq (8) shows that an outside follower who has a formation displacement $D_R$ of 500 feet and can make a given turn only at the leader air speed will lag behind the nominal position at the end of a one radian turn a maximum of 500 feet. A 20° heading turn will cause an outside follower to lag approximately 175 feet.

In a long turn both leader and follower are simultaneously turning at a constant turn rate over a substantial portion thereof. From $t = o$ to $t = t_r + D_S/V$ the follower speed $V_F$ is $V + A_1 t$, and the airmass distance traveled is:

$$\int_o^{(t_r + D_S/V)} V_F dt = V(t_r + D_S/V) + A_1/2(t_r + D_S/V)^2 \quad (41)$$

substituting $VD_R/R_c(t_r+D_S/V)$ for $A_1$ from Eq (3) gives, $$(t_r + D_S/V) \quad (42)$$

-continued $$\int_0 V_F dt = Vt_r(1 + D_R/2R_c) + D_S + D_S D_R/2R_c$$

Since the sum $Vt_r(1+D_R/2R_c)+D_S$ is the follower path distance to a point abreast of the leader end of roll-in position, Eq (42) shows that at time $(t_r+D_S V)$ an outside follower is a distance $D_S D_R/2R_c$ beyond a point abreast of the leader end of roll-in position along the correct flight path, and an inside follower is substantially the same distance short of being abreast of the leader end of roll-in position.

Figure 5:
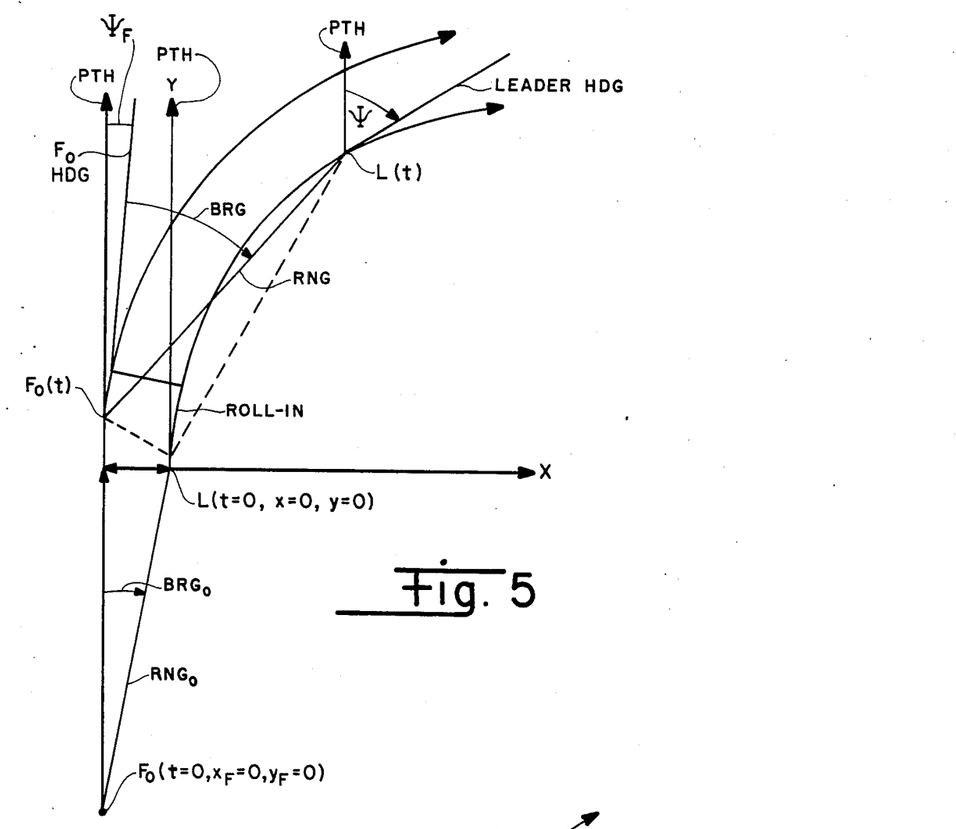
FIG. 5 is a diagram of paths for a leader and follower during roll-in to define nominal range and bearing to a leader.

Referring now to FIG. 5, a diagram is shown of the paths, two representative positions, and headings of a leader L and follower $F_O$ to illustrate and define the nominal range and bearing to the leader during turns. Nominal coordinates of the leader and of the follower may be defined in terms of an x,y horizontal coordinate system referencing leader position with time, and having an origin at the leader airmass position at start of leader roll-in and the y axis along the pre-turn heading (PTH). Angles $\psi_F$ and $\psi$ are, respectively, follower and leader heading change from the pre-turn heading. Coordinates x,y refer to the leader and coordinates $x_F, y_F$ refer to the follower. The nominal bearing BRG and the nominal range RNG from $F_O$ to L are given by:

$$BRG = \tan^{-1}[(x-x_F)/(y-y_F)] - \psi_F$$

$$RNG = [(x-x_F)^2 + (y-y_F)^2]^{\frac{1}{2}}$$

Each follower computes leader coordinates at time t (as measured from start of leader roll-in) as follows:

$$x = V \int_0^t (\sin \psi) dt; \quad y = V \int_0^t (\cos \psi) dt$$

where $\psi$ is computed as follows:

| DURING TIME | COMPUTE $\psi$ USING |
|---|---|
| o to $t_r$ | $(g \tan B_c) t^2 / 2Vt$ |
| $t_r$ to $(t_r + t_c)$ | $(g \tan B_c)(t - t_r/2)/V$ |
| $(t_r + t_c)$ to $(2t_r + t_c)$ | $(g \tan B_c)[t_c + t_r/2 + (t - (t_r + t_c))^2/2t_r]/V$ |
| $(2t_r + t_c)$ to $(2t_r + t_c + D_S/V)$ | $(g \tan B_c)(t_c + t_r)/V$ |

Each follower computes individual follower coordinates $x_F, y_F$ at time t as follows:

$$x_F = \int_0^t V_F(\sin \psi_F) dt \pm |D_R|$$

$$y_F = \int_0^t V_F(\cos \psi_F) dt - D_S$$

where $+|D_R|$ is used by $F_I$ on the inside of the turn and $-|D_R|$ is used by $F_o$. During the pre-turn time span, of approximately 30 seconds, the sum of the follower heading $HDG_F$ and the SKE measured bearing $BRG_{SKE}$ can be considered to be substantially equal to the sum of the pre-turn heading PTH and the nominal pre-turn bearing $BRG_o$, viz., $$HDG_F + BRG_{SKE} = PTH + BRG_o$$

Discrete measures of $BRG_{SKE}$ and corresponding discrete values of $PTH_i$ are normally determined each 1.5 seconds:

$$PTH_i = HDG_{Fi} + BRG_{SKEi} - BRG_o$$

The discrete values of $PTH_i$ are averaged over the pre-turn time span to determine PTH:

$$PTH = \frac{1}{N} \sum_{i=1}^{N} (HDG_{Fi} + BRG_{SKEi} - BRG_o)$$

where N is the number of discrete measures taken (about 20).

At t=0, the initial range and bearing ($RNG_o, BRG_o$) under IMC conditions for formation 10 of FIG. 1 may be as shown in Table I.

TABLE I

| NOMINAL PRE-TURN RANGE (feet) AND BEARINGS (deg) | | |
|---|---|---|
| Follower | RNG | BRG |
| Right Wingman | 4031.13 | −7.125 |
| Left Wingman | 8015.61 | +3.576 |
| Next Element Leader | 12000.00 | 0 |

Figure 6:
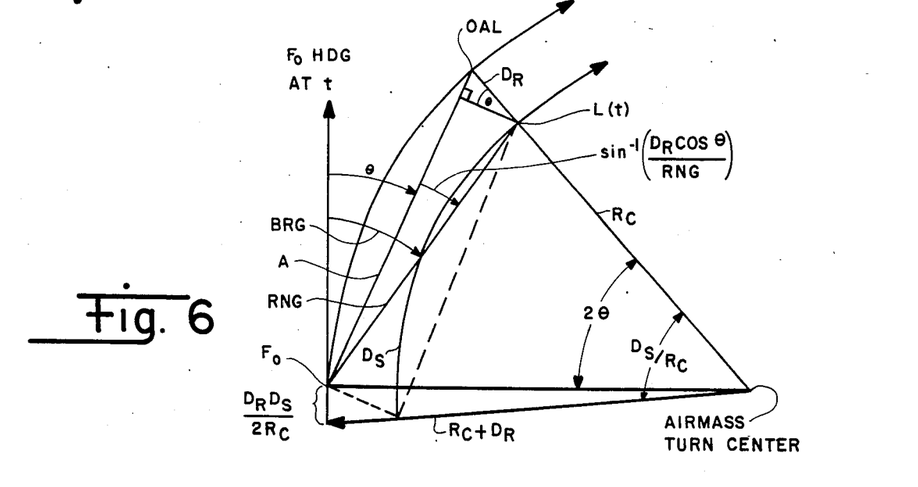

The maximum bearing change occurs when a follower is beyond roll-in, the leader has not begun roll-out, and the turn is performed at maximum leader bank angle (e.g., 20°) and at minimum leader true air speed (about 200 knots). Under these conditions the RNG and BRG may be determined as illustrated in FIG. 6. In this example, the bearing from follower $F_O$ to leader L is the sum of the bearing $\theta$ to the outside abreast-of-leader point (AOL) and the angle subtended from AOL to L. The follower arcuate path length between $F_O$ and AOL is $D_S(1+D_R/2R_c)$ and the angle subtended by this arc $2\theta$, is $$2\theta = \frac{D(1 + D_R/2R_c)}{R_c(1 + D_R/R_c)}$$

The distance A between $F_O$ and AOL is $2(R_c+D_R) \sin \theta$, and the range RNG is thus:

$$RNG = (A^2 + D_R^2 - 2AD_R \sin \theta)^{\frac{1}{2}}$$

and the bearing BRG is, $$\pm BRG = [\sin^{-1}(D_R \cos \theta / RNG)] + \theta$$

These equations give corresponding values for an inside follower by setting $D_R = -|D_R|$, and for right or left turns by using $+BRG$ for right turns and $-BRG$ for left turns, where a positive bearing is to the right and a negative bearing to the left.

The nominal time for leader roll-out, for predetermined end-of-turn heading ETH may be given by:

$$t_{RO} = V(ETH - PTH)/g \tan B_c$$

Table II shows maximum anticipated pre-turn to in-turn changes in bearings and ranges for each follower for a representative formation 10 of FIG. 1.

TABLE II

PRE-TURN TO IN-TURN CHANGES IN BEARINGS AND RANGES, $\Delta$BRG & $\Delta$RNG, FOR V = 200 KTS and $B_c$ = 20°

| | Right Turn | | Left Turn | |
|---|---|---|---|---|
| | $\Delta$BRG | $\Delta$RNG | $\Delta$BRG | $\Delta$RNG |
| RWM | 12.19° | −27.9 ft | −11.38° | −25.2 ft |
| LWM | 22.74° | −209.1 ft | −24.37° | −231.6 ft |
| NEL | 35.27° | −732.4 ft | −35.27° | −732.4 ft |

During a formation turn the nominal range and bearing of the leader, RNG and BRG, is compared in the mission computer to the measured range and bearing supplied by the SKE to determine position error signals. The error signals are utilized to generate in-heading and cross-heading position error correction commands which may be sent to the autopilot/autothrottle system of the aircraft to make appropriate corrections.

It is understood that certain modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for performing a coordinated turn of a formation of a plurality of aircraft flying at a first air speed V, said plurality of aircraft including a leader aircraft and at least one follower aircraft in said formation, said formation characterized by preselected rearward displacement $D_S$ and lateral displacement $D_R$ of said follower aircraft relative to said leader aircraft and a known pre-turn leader aircraft flight path, said method comprising the steps of:

(a) rolling said leader aircraft into said turn at a preselected roll rate for a first preselected time interval $t_r$ to a preselected leader aircraft bank angle $B_c$, maintaining said leader aircraft at said preselected leader bank angle for a second preselected time interval, and rolling said leader aircraft out of said turn at said roll rate for a third time interval substantially equal to said first time interval, whereby said leader aircraft completes said turn with determinable change in flight direction;

(b) turning said follower aircraft in response to said rolling of said leader aircraft into said turn by:

(i) gradually changing the air speed of said follower aircraft to a second air speed from the start of said rolling of said leader aircraft into said turn until the earlier of the time of said rolling of said leader aircraft out of said turn and the lapse of a period of time substantially equal to $t_r + D_S/V$ from inception of said rolling of said leader aircraft into said turn, maintaining said second air speed until start of said rolling of said leader aircraft out of said turn, and gradually changing the air speed of said follower aircraft from said second air speed to that of said leader aircraft over a time interval substantially equal to $t_r + D_S/V$ from inception of said rolling of said leader aircraft out of said turn;

(ii) maintaining level flight from inception of said rolling of said leader aircraft into said turn until said distance $D_S$ is traversed by said follower aircraft;

(iii) banking said follower aircraft into said turn to a first follower aircraft bank angle while adjacent that portion of the path said leader aircraft traversed during the rolling of said leader aircraft into said turn, banking said follower aircraft into said turn to a second follower aircraft bank angle while adjacent that portion of the path said leader aircraft traversed while maintaining said preselected leader aircraft bank angle $B_c$, banking said follower aircraft into said turn to a third follower aircraft bank angle while adjacent that portion of the path said leader aircraft traversed during the rolling of said leader aircraft out of said turn;

(iv) unbanking said follower aircraft to level flight when said follower aircraft is adjacent that portion of the path of said leader aircraft beyond leader aircraft roll-out; whereby the spacing between said leader aircraft and said follower aircraft is maintained substantially constant during said turn.

2. The method of claim 1 wherein said rolling of said leader aircraft into said turn is characterized by a substantially constant range of change of bank angle tangent from level flight to said preselected leader bank angle $B_c$, and wherein said rolling of said leader aircraft out of said turn is characterized by a substantially constant rate of change of bank angle tangent from said preselected leader bank angle $B_c$ to level flight at the completion of said turn.

3. The method of claim 1 wherein the air speed of said leader aircraft is maintained substantially constant during said turn.

4. The method of claim 3 wherein said changing the air speed of said follower aircraft to said second air speed is characterized by one of substantially constant acceleration and substantially constant deceleration, and said changing the air speed of said follower aircraft from said second air speed to that of said leader aircraft is characterized by the other.

5. The method of claim 1 wherein:

said banking said follower aircraft into said turn to said first follower aircraft bank angle is performed over a path length of said follower aircraft substantially equal to $Vt_r(1 + D_R/2R_c)$, and said first bank angle is substantially equal to $\tan^{-1}\{[1-(1+2D_RS_F/R_cVt_r)^{-1}]V_F^2/gD_R\}$, while adjacent that portion of the path said leader aircraft traversed during the rolling of said leader aircraft into said turn;

said banking of said follower aircraft into said turn to said second follower aircraft bank angle is subsequently performed over a path length of said follower aircraft substantially equal to $Vt_r(1 + D_R/R_c)$, and said second bank angle is substantially equal to $\tan^{-1}[V_F^2/g(R_c + D_R)]$, while adjacent that portion of the path said leader aircraft traversed while maintaining said preselected leader bank angle $B_c$; and said banking said follower aircraft into said turn to a third follower aircraft bank angle is subsequently performed over a path length of said follower aircraft substantially equal to $Vt_r(1 + D_R/2R_c)$, and said third bank angle is substantially equal to $\tan^{-1}\{[1-((1+D_R/R_c)^2 - 2D_RS_F/R_cVt_r)^{-1}]V_F^2/gD_r\}$, while adjacent that portion of the path said leader aircraft traversed during the rolling of said leader aircraft out of said turn;

where $R_C$ is the radius of curvature of said leader aircraft during said turn, $S_F$ is the path length of said follower aircraft during said turn from start of said banking of said follower aircraft, and $D_R$ is taken as positive if the flight path of said follower aircraft is outside said leader aircraft during said turn and negative if inside said leader aircraft during said turn.

* * * * *

UNITED STATES PATENT AND TRADEMARK OFFICE
CERTIFICATE OF CORRECTION

PATENT NO. : 4,674,710

DATED : June 23, 1987

INVENTOR(S) : Edward Rodriguez

It is certified that error appears in the above-identified patent and that said Letters Patent is hereby corrected as shown below:

In the ABSTRACT, line 4, "formtion" should be ---formation---.

Col 1, line 55, "automatic" should be ---automate---.

Col 3, line 33, "flow" should be ---fly---.

Col 5, line 57, "of" should be ---if---.

Col 6, line 65, "directiion" should be ---direction---.

Col 7, line preceding Eq (14), "vis." should be ---viz.---.

Col 9, in Eq (30), "$t_R$" should be ---$t_r$---.

Col 9, line 50, "(32a)" should be ---(32)---.

Col 11, Eq (35), second line, "$T_r$" should be ---$t_r$--- and "$T_c$" should be $t_c$---.

Col 12, Eq (41), an integral sign ---$\int$--- should be inserted in front of "$V_F dt$".

Col 13, Eq (42), an integral sign ---$\int$--- should be inserted in front of "$V_F dt$".

UNITED STATES PATENT AND TRADEMARK OFFICE
CERTIFICATE OF CORRECTION

PATENT NO. : 4,674,710

DATED : June 23, 1987

INVENTOR(S) : Edward Rodriguez

It is certified that error appears in the above-identified patent and that said Letters Patent is hereby corrected as shown below:

Col 13, in equations for "x" and "y" following line 37, an integral sign ---$\int$--- should be inserted following "V" (two instances.

Col 13, in the table, first line, "2Vt" should be ---$2Vt_r$---.

Col 13, in the equation for "$x_F$" at the third line following the table, an integral sign ---$\int$--- should be inserted in front of "$V_F$".

Col 13, in the equation for "$y_F$" at the fourth line following the table, an integral sign ---$\int$--- should be inserted in front of "$V_F$".

Col 14, in the equation thirteen lines after Table I, "D" should be ---$D_S$---.

Col 16, line 24, "range" should be ---rate---.

UNITED STATES PATENT AND TRADEMARK OFFICE
CERTIFICATE OF CORRECTION

PATENT NO. : 4,674,710

DATED : June 23, 1987

INVENTOR(S) : Edward Rodriguez

It is certified that error appears in the above-identified patent and that said Letters Patent is hereby corrected as shown below:

Col 16, line 47, in claim 5, the exponent "-t" should be --- -1/2 ---.

Col 16, line 65, in claim 5, the exponent "-t" should be --- -1/2 ---.

Signed and Sealed this

Twenty-second Day of December, 1987

Attest:

DONALD J. QUIGG

*Attesting Officer*  *Commissioner of Patents and Trademarks*